Patented Feb. 23, 1954

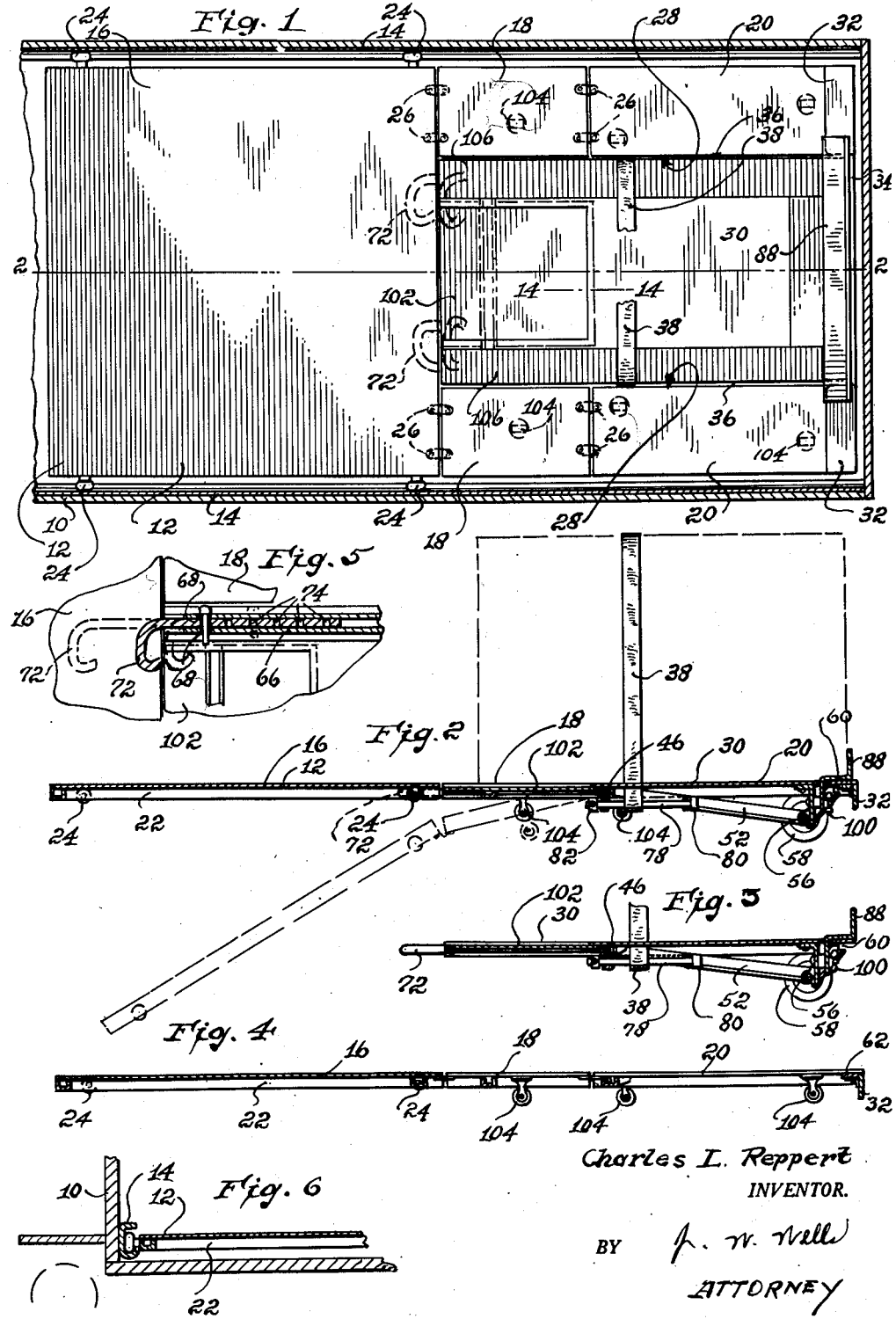

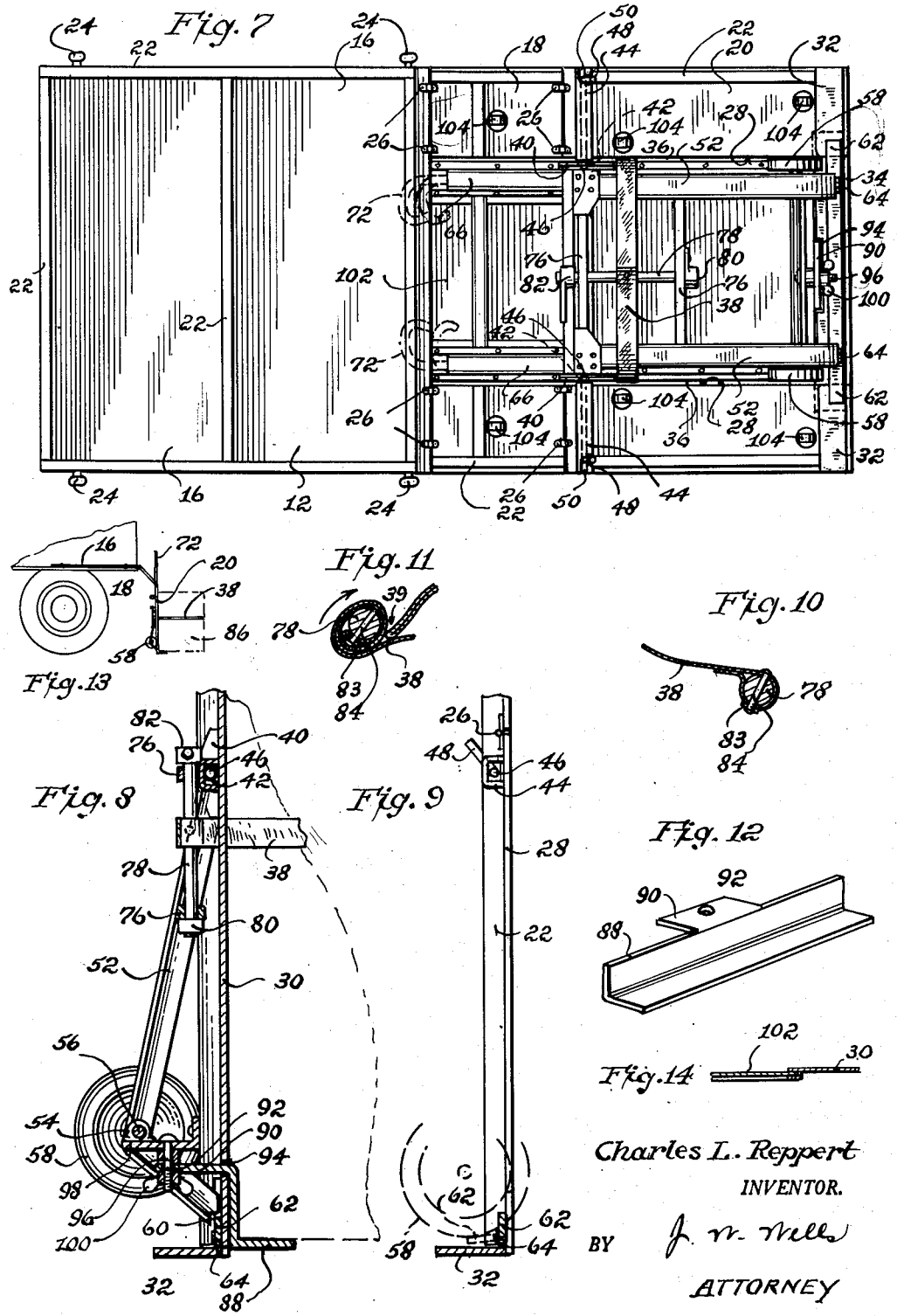

2,670,093

UNITED STATES PATENT OFFICE 2,670,093

COMBINATION PLATFORM AND HAND TRUCK

Charles L. Reppert, Trenton, N. J.

Application May 20, 1952, Serial No. 288,969

6 Claims. (Cl. 214—515)

This invention relates to improvements in equipment for loading heavy merchandise, such, for example, as television consoles, refrigerators, heating units and the like, into and unloading such objects from delivery truck beds and transporting them to and from locations in stores, residences or other buildings.

One of the principal objects of the present invention is to provide simple and inexpensive equipment with which one man can transport relatively bulky and heavy units from place to place, without the aid of any other person.

In the carrying out of my invention I have provided a specially designed platform to be installed movably in a delivery truck bed and a specially designed hand truck adapted to interfit with and be detachably coupled to the platform in such a manner as that both platform and hand truck will be movable together longitudinally of the truck bed when in coupled relation, the hand truck being separately operable when detached from the special platform.

Therefore, another important object of the present invention is to provide a movable platform in a truck bed which platform is longitudinally movable in the truck bed, and also having means for detachably coupling a hand truck to the platform.

A further object of this invention is to provide a hand truck having means cooperative with the means carried by the platform for detachably coupling the platform and hand truck together.

A still further object of the invention is to provide improved means in a hand truck for tightening a holding strap around the article to be handled.

I am aware of various types of conveyors adapted for installation in truck beds for handling heavy merchandise, but no previous devices, as far as I am aware, have contemplated the combination of a hand truck with a movable platform to form a coupled unit, by means of which an article may be transported from or to a location distant from a delivery truck and loaded into or unloaded from the truck by one man, as is achieved in my improved combination platform and hand truck.

Other objects and advantages of my invention will be apparent from the following specification and reference to the accompanying drawings illustrating one embodiment of my invention, in which Fig. 1 is a top plan view showing the platform and the hand truck coupled together and in a truck bed, the latter being shown partly in cross-section;

Fig. 2 is a section taken on the line 2—2 of Fig. 1;

Fig. 3 is a sectional view of the hand truck detached from the platform;

Fig. 4 is a sectional view of the platform detached from the hand truck;

Fig. 5 is a detail sectional view showing one of the extensible hand truck handles;

Fig. 6 is a detail sectional view showing the mounting of the movable platform in a track carried by the truck bed;

Fig. 7 is a bottom plan view of the coupled unit shown in Fig. 1;

Fig. 8 is an enlarged sectional view of the front portion of the hand truck, disposed in a vertical position;

Fig. 9 is an enlarged sectional view of the rear portion of the movable platform, also disposed in a vertical position;

Fig. 10 is a detail sectional view of the strap tightening device;

Fig. 11 is a view similar to Fig. 10 but showing the strap partially tightened;

Fig. 12 is a perspective view of the hand truck toe plate;

Fig. 13 is a diagrammatic view of the combined platform and hand truck in loading and unloading position; and Fig. 14 is a detail section taken on the line 14—14 of Fig. 1.

Referring to the drawings in which like reference numerals designate like parts in the several views, it will be seen in Figs. 1 and 6 that the truck bed 10, which may be of any conventional design, is prepared for the installation therein of the longitudinally movable platform 12 by the attachment of a pair of longitudinally disposed, channel track members 14 to the inner walls of the truck bed, these channel members being open at their rear ends. The platform 12 is made up of a plurality of sections 16, 18, and 20, in the embodiment shown, which may be made of sheet metal reinforced by metal bars 22, or made out of hard wood or other suitable material. Rollers 24 are mounted on the longitudinal edges of the front section 16 and these rollers are inserted in the channel track members 14 which hold the platform in longitudinally aligned position in relation to the truck bed, and also hold it against being tipped upwardly by a heavy article on its rear end.

The sections of the platform 18 and 20 are of relatively narrow width and in transversely spaced pairs, hinged at their adjacent ends to the rear end of section 16 and to the adjacent ends of each other, by means of hinges 26, leaving a relatively wide longitudinal space 28, within which the hand truck 30 is removably mounted. The rear ends of sections 20 are connected by a transverse angle bar 32 in which the intermediate portion of its front end is cut away to form a space 34 of a width substantially coincident with that of space 28. The width of the hand truck is slightly less than that of spaces 28 and 34, thereby leaving a narrow slot 36 between the outer edge of the truck and the edges of the space 28 to permit a holding strap 38 to pass therethrough.

As shown more clearly in Figs. 7 and 8, the hand truck is provided with a pair of opposed, brackets 40 depending from its outer edges (assuming the truck to be disposed in a horizontal position), each of these brackets being provided with a through opening 42. Attached to the underneath side of each of the sections 20 is a transversely disposed tubular bearing 44 in which is mounted a slidable rod 46 one end of which has a perpendicular handle portion 48 and the other end being insertable in one of the openings 42 in an adjacent bracket 40. These rods are in alignment with and in opposed end to end relation. The handle portion 48 fits in a bayonet slot 50, by means of which the rod 46 can be locked in the bracket 40. When the handle is turned to a position of registry with the longitudinal portion of the slot 50 the rod can be withdrawn from the opening 42, thereby releasing the hand truck from the platform 12. The frame of the hand truck 30 includes a pair of inclined bars 52 having bearings 54 near their front ends in which are mounted a transverse shaft 56 supporting a pair of spaced wheels 58. The extreme front portion of the bars 52 incline toward the bottom portion of the truck and terminate in notches 60. A narrow plate 62 is hingedly connected by hinges 64 to the vertical intermediate portion of the angle bar 32 so that it spans the space 34 and extends a short distance beyond the edges of that space on the inner, or front side of the bar 32. The hinges 64 are of a spring type which normally maintain the plate 62 in perpendicular relation with and against the back portion of the bar 32.

The front end of the hand truck 30 includes a pair of longitudinally arranged tubular members 66, shown in sectional detail in Fig. 5, each of which is provided with lateral openings 68 and a removable pin 70. An extensible handle 72, having a shank portion provided with a plurality of lateral openings 74, is insertable in the tubular members 66. Any one of the openings 74 can be brought into registry with the openings 68. Thus, the handles may be extended to any desired length and secured by the pin 70. The handles can also be entirely removed from the hand truck.

Assuming that the hand truck 30 is detached from the platform 12, and that the hand truck is in a vertical position for loading as shown in Figs. 8 and 13, the rods 46 are placed in withdrawn position so that they will clear the outer sides of the brackets 42, and the hand truck is rolled through the space 34 of the single bar 32 and into the space 28 of the platform 12. During this movement the wheels 58 will roll against the long plate 62 and press it down, as indicated in dotted lines in Fig. 9. When the wheels have rolled over this plate it will spring back to its perpendicular position against the bar 32, and, as more clearly shown in Fig. 8 will then interlock with the notches 60 in the bars 52. The rods 46 can then be forced through the openings 42 in brackets 40, with which the rods will then be in registry, thereby securely locking the truck in the platform.

As indicated in dotted lines in Figs. 1, 3, 5 and 7, the handles 72 may be pushed back into the tubular members 66 until the outer ends of the handles clear the rear edge of the platform section 16, to enable the platform sections to lie in flat alignment with the handles entirely underneath the middle section 18.

Journaled underneath the hand truck 30 in bearings 76 is a longitudinally extending shaft 78 on which the holding strap 38 is wound. On one end of shaft 78 is a reversible ratchet 80 (of conventional type), which is mounted on the truck frame, so that when the strap is tightened about the article loaded on the truck it will be held against backward movement. A ratchet wrench 82 (of conventional type) is detachably mounted on the other end of shaft 78 to provide means of rotating the shaft in a limited space. The holding strap 38 may be secured to the shaft 78 by means of a clamp 83 and rivet 84, as shown in Fig. 10. As the winding proceeds the free end portion of the strap is doubled, as indicated at 39, and inserted between coils of the strap, as shown in Fig. 11. By this means the tight winding of the strap on the article 86 (indicated in dotted lines in Figs. 2, 8 and 13) may be completed without danger of slipping during transportation of the article. However, other suitable means for tightening the holding strap may be used.

On the front end of hand truck 30, is a removable toe plate 88, shown in perspective in Fig. 12. This plate has a relatively narrow rear portion 90 which is provided with an opening 92 near its bottom edge. This portion projects through an opening 94 in the floor of the truck and it, together with the plate, is detachably secured to the hand truck by a bolt 96, which projects through a cross bar 98 and the opening 92, and a thumb nut 100. The plate 88 is thus removable from the hand truck when it is desired, during periods when it is not in use, to provide an uninterrupted surface in the bottom of the motor truck bed.

From the foregoing description it will be seen that when my improved hand truck is loaded it is moved to the delivery truck, and the movable platform is withdrawn to the rear of the truck bed, as shown in Fig. 13, so that sections 20 of the platform will be substantially vertical, and sections 18 will be buckled to a downwardly inclined position. The hand truck is then placed in substantially vertical position and coupled in to the platform. It is then relatively easy for one person to lift the lower end, together with the hand truck, and shove the platform and load toward the front end of the truck bed. As already mentioned, the channel track members 14 and rollers 24 will prevent the front end of the platform from tipping upwardly during the loading procedure. If desired, the person loading the article may attach the handles to the hand truck, get into the motor truck bed and draw the load into the truck bed by pulling on the handles.

It is also obvious that a cable from a winch or other power device in the front of the delivery truck may be attached to the handles to pull the load into the truck bed.

The unloading procedure is generally the reverse of that described.

A panel 102 in the rear end of the hand truck is slidable and removable to provide an opening for television consoles and the like.

A plurality of swiveled rollers 104 mounted on the bottom of sections 18 and 20 facilitate their passage over the end of the truck bed and other irregular surfaces.

The inclined bars 52 of my improved hand truck provide effective runners for dragging the truck up into the motor truck bed by means of the handles 72. The top of the hand truck frame may be covered with rubber or other suitable flexible material 106 to protect the surface of finished articles carried on the truck.

My improved equipment is of particular value to appliance dealers and repair shops which have only one man available for handling heavy articles. It is also a distinct time saver, in that when an article is loaded onto the hand truck it remains fastened thereto until delivered to its destination. When the hand truck is not in active use it remains attached to the platform, thereby providing a substantially flat floor in the truck bed for supporting any articles or materials transported therein.

Obviously, various changes in the details of construction of my improved platform and hand truck may be made without departing from the spirit and scope of my invention, and it should, therefore, be understood that the embodiment of the invention shown and described is intended to be illustrative, only, and not limited to such specific details of construction.

I claim:

1. A combination platform and hand truck comprising a plurality of flat floor sections hinged together at their adjacent ends and adapted to fit within a delivery truck bed, the rear sections being relatively narrow and spaced apart in pairs, thereby forming a centrally disposed rectilinear space extending from the rear edge of the front section to the outer end of the rearmost section and the front section being formed of a solid sheet, a hand truck having a relatively flat floor adapted to fit within said rectilinear space with its floor surface substantially coincident with that of said platform; and cooperative means carried by said platform and said hand truck for detachably coupling said platform and hand truck together; said means including a transversely disposed hinged plate on the outer end of said rearmost section and a pair of notches in the front end of the frame of said hand truck engageable with said hinged plate.

2. A combination platform and hand truck comprising a plurality of flat floor sections hinged together at their adjacent ends and adapted to fit within a delivery truck bed, the rear sections being relatively narrow and spaced apart in pairs, thereby forming a centrally disposed rectilinear space extending from the rear edge of the front section to the outer end of the rearmost section, a hand truck having a relatively flat floor adapted to fit within said rectilinear space with its floor surface substantially coincident with that of said platform; and cooperative means carried by said platform and said hand truck for detachably coupling said platform and hand truck together, said means comprising a transverse plate hingedly mounted on the outer end of the rearmost section and transversely spaced notches in the front end of the hand truck frame engageable with said plate, and also a pair of transversely aligned and opposed rods transversely and slidably mounted on the front underneath side of the rearmost section and a pair of transversely spaced brackets mounted on the frame of said hand truck, said rods being engageable with and detachable from said brackets.

3. A combination platform and hand truck according to claim 1 and including a shaft journaled under the floor of said truck, a holding strap secured at one end to said shaft, and ratchet means mounted on said truck and cooperative with said shaft in tightly winding said strap around said shaft, said hand truck being slightly narrower than said rectilinear space, thereby providing a narrow slot at each side of said hand truck for passage therethrough of said holding strap.

4. A combination platform and hand truck according to claim 1 and including rollers on each side of said front section and a pair of channel track members mounted on the inner walls of said delivery truck, within which channel members said rollers are mounted for longitudinal movement of said platform.

5. A combination platform and hand truck according to claim 1 in which said hand truck is provided with a pair of longitudinally extensible and removable handles, and a socket for each of said handles which permits their outer ends to be axially depressed rearwardly beyond the rear of said front section.

6. A combination platform and hand truck comprising three sections hinged together at their adjacent ends and adapted to fit within a delivery truck bed, the front section being the longer, the rearmost section being of sufficient length to reach from the floor of the delivery truck bed to the ground, and the intermediate section being relatively short, the rear sections being relatively narrow and transversely spaced apart in pairs, thereby forming a centrally disposed rectilinear space extending from the rear edge of the front section to the outer end of the rearmost section, a hand truck having a relatively flat floor adapted to fit within said rectilinear space with its floor surface substantially coincident with that of said platform; and cooperative means carried by said platform and said hand truck for detachably coupling said platform and hand truck together.

CHARLES L. REPPERT.

References Cited in the file of this patent

UNITED STATES PATENTS

| Number | Name | Date |
|---|---|---|
| 372,976 | Heilman | Nov. 8, 1887 |
| 1,142,088 | Greene | June 8, 1915 |
| 1,429,432 | Irrgang | Sept. 19, 1922 |
| 1,465,945 | Lea | Aug. 28, 1923 |
| 1,985,362 | Clyde | Dec. 25, 1934 |
| 2,377,399 | Brumfield | June 5, 1945 |
| 2,560,206 | Beatty | July 10, 1951 |
| 2,579,639 | Adams | Dec. 25, 1951 |
| 2,598,489 | Bayer et al. | May 27, 1952 |
| 2,607,502 | Willitts | Aug. 19, 1952 |